(12) United States Patent
Yamashita (10) Patent No.: US 7,864,442 B2
(45) Date of Patent: Jan. 4, 2011

(54) ZOOM LENS

(75) Inventor: Atsushi Yamashita, Sagamihara (JP)

(73) Assignee: Konica Minolta Opto, Inc., Tokyo (JP)

( * ) Notice: Subject to any disclaimer, the term of this patent is extended or adjusted under 35 U.S.C. 154(b) by 36 days.

(21) Appl. No.: 12/468,798

(22) Filed: May 19, 2009

(65) Prior Publication Data

US 2009/0290228 A1 Nov. 26, 2009

(30) Foreign Application Priority Data

May 26, 2008 (JP) ............................. 2008-136370

(51) Int. Cl.
*G01B 15/14* (2006.01)
(52) U.S. Cl. .................. 359/683; 359/684; 359/676
(58) Field of Classification Search ................. 359/649, 359/659, 676, 682–684; 396/72–88; 348/240.99–240.33; *G02B 15/14*
See application file for complete search history.

(56) References Cited

U.S. PATENT DOCUMENTS 7,450,314 B2 * 11/2008 Satori et al. ................. 359/683
7,719,773 B2 * 5/2010 Atsuumi et al. ............. 359/683
2008/0304161 A1 12/2008 Souma
2008/0304167 A1 12/2008 Souma

FOREIGN PATENT DOCUMENTS

JP 2001-033703 2/2001
JP 2005-189670 7/2005

* cited by examiner

*Primary Examiner*—Darryl J Collins
*Assistant Examiner*—Zachary Wilkes
(74) *Attorney, Agent, or Firm*—Cohen Pontani Lieberman & Pavane LLP (57) ABSTRACT

A zoom lens includes, in order from an object side thereof: a first lens group with a positive refractive power; a second lens group with a negative refractive power; a third lens group with a positive refractive power; a fourth lens group with a negative refractive power; and a fifth lens group with a positive refractive power. A power of the zoom lens is varied by changing intervals between neighboring lens groups in the first through fifth lens groups. The second lens group includes a cemented lens consisting of one positive lens and one negative lens, and the third lens group includes a cemented lens consisting of two positive lenses and one negative lens.

20 Claims, 9 Drawing Sheets

ZOOM LENS

This application is based on Japanese Patent Application No. 2008-136370 filed on May 26, 2008, in Japanese Patent Office, the entire content of which is hereby incorporated by reference.

TECHNICAL FIELD

The present invention relates to a compact zoom lens with a high variable-power ratio of about ×15 and a wide angle of view of 70° or more at a wide-angle end, which is suitable for a digital still camera and a video camera employing CCD (charge-coupled device) and CMOS (complementary metal-oxide-semiconductor).

BACKGROUND

In a digital still camera and a video camera employing CCD and CMOS, there are increasing demands for a compact zoom lens with a high variable-power ratio and a wide angle of view. Zoom lenses satisfying the aforesaid demands are disclosed in some Patent Documents. Each of these zoom lenses has five lens groups with a positive refractive power, a negative refractive power, a positive refractive power, a negative refractive power, and a positive refractive power in this order from the object side, and there is known a zoom lens in which variable-power ratio is about ×5 and an angle of view at a wide-angle end is about 76° (see Unexamined Japanese Patent Application Publication No. 2005-189670).

There is also known a zoom lens in which variable-power ratio is about ×50 and an angle of view at a wide-angle end is about 70° (see Unexamined Japanese Patent Application Publication No. 2001-33703).

In the aforesaid Patent Documents, the number of elements in the second lens group is four because all of four lenses in the second lens group are provided as single lenses, or the number of elements in the third lens group is three because four lenses in the third lens group are provided as two single lenses and one cemented lens. Accordingly, they cause relatively larger number of error contributing factors corresponding to lens interval and lens decentration, resulting in problems that accuracy control for lens assembly is complicated, and productivity is lowered.

SUMMARY

The present invention is provided to suggest a compact zoom lens including a positive lens group, a negative lens group, a positive lens group, a negative lens group and a positive lens group in this order from the object side and employing a cemented lens for the second lens group and the third lens group, by which number of elements in a lens group decreases, a wide angle of view, a high variable power ratio, and easy assembling are exhibited, and various aberrations are corrected satisfactorily.

There is provided a zoom lens comprising, in order from an object side thereof: a first lens group with a positive refractive power; a second lens group with a negative refractive power; a third lens group with a positive refractive power; a fourth lens group with a negative refractive power; and a fifth lens group with a positive refractive power. A power of the zoom lens is varied by changing intervals between neighboring lens groups in the first through fifth lens groups. The second lens group comprises a cemented lens consisting of one positive lens and one negative lens, and the third lens group comprises a cemented lens consisting of two positive lenses and one negative lens.

These and other objects, features and advantages according to the present invention will become more apparent upon reading of the following detailed description along with the accompanied drawings.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

DESCRIPTION OF EMBODIMENTS

An embodiment of the invention will be explained as follows.

An embodiment of the present invention is a zoom lens comprising, in order from an object side thereof: a first lens group with a positive refractive power; a second lens group with a negative refractive power; a third lens group with a positive refractive power; a fourth lens group with a negative refractive power; and a fifth lens group with a positive refractive power. A power of the zoom lens is varied by changing intervals between neighboring lens groups in the first through fifth lens groups. The second lens group comprises a cemented lens consisting of one positive lens and one negative lens, and the third lens group comprises a cemented lens consisting of two positive lenses and one negative lens.

In the present embodiment, the total system of the zoom lens is formed in a five-group structure in which lens groups have positive, negative, positive, negative, positive refractive powers, and it is possible to correct aberrations by at a higher degree of freedom than that of a zoom lens formed as a four-group structure in which lens groups have positive, negative, positive, positive refractive powers which has been used for the above purpose.

Further, in the present embodiment, the second lens group includes a cemented lens composed of one positive lens and on negative lens. If all lenses of the second group are provided as single lenses, the number of elements in the lens group increases. It causes relatively larger man hours for assembling lenses in a lens barrel, and relatively large numbers of error contributing factors according to lens intervals and lens decentration, resulting in the complicated control, thus, excellent productivity is hardly expected. By forming at least a part of the second lens group to be a cemented lens, the number of elements in the second lens group decreases, and it is possible to avoid deterioration of the property of the total lens system due to errors in lens interval and decentration and to reduce man hours for assembling, than the occasion where all lenses in the second lens group are made to be a single lens. Owing to this, a zoom lens realizes easy production control.

Further, contributions of the third lens group of the zoom lens to spherical aberration and astigmatism are great, and the third lens group has been composed of two positive single lenses and of one cemented lens of positive-negative lenses in order to correct the aberrations satisfactorily, in many cases. However, the number of elements in the third lens group is three in the above cases, and it causes relatively larger man hours for assembling lenses in a lens barrel, and relatively large numbers of error contributing factors according to lens intervals and lens decentration, resulting in the complicated control, thus, excellent productivity is hardly expected. In the present embodiment, the third lens group includes a cemented lens formed with three lenses of two positive lenses and one negative lens. By reducing the number of elements in the third lens group, it is possible to avoid deterioration of the property of the total lens system due to lens interval errors and decentration and to reduce man hours for assembling. Owing to this, a zoom lens realizes easy production control.

In the aforesaid embodiment, it is preferable that the second lens group consists of a negative lens n1, a negative lens n2, and a positive lens p1, in order from the object side, and the negative lens n2 and the positive lens p1 are cemented and satisfies the following conditional expressions.

$$n_{n1} > 1.7 \quad (1)$$

$$n_{p1} - n_{n2} > 0.2 \quad (2)$$

In the expressions, $n_{n1}$ is a refractive index of the negative lens n1 for d-line, $n_{n2}$ is a refractive index of the negative lens n2 for d-line, and $n_{p1}$ is a refractive index of the positive lens p1 for d-line.

Further, in the aforesaid embodiment, it is more preferable that the second lens group consists of a negative lens n1, a negative lens n2, and a positive lens p1, in order from the object side, and the negative lens n2 and the positive lens p1 are cemented and satisfy the following conditional expressions.

$$n_{n1} > 1.8 \quad (3)$$

$$n_{p1} - n_{n2} > 0.4 \quad (4)$$

In the expressions, $n_{n1}$ is a refractive index of the negative lens n1 for d-line, $n_{n2}$ is a refractive index of the negative lens n2 for d-line, and $n_{p1}$ is a refractive index of the positive lens p1 for d-line.

When the second lens group satisfies the conditional expression (1), a lens can have a larger curvature radius with keeping the same refractive power. It is possible to inhibit occurrences of astigmatism and distortion which are caused especially at the wide-angle side. It is more preferable that the second lens group satisfies the conditional expression (3). Further, by satisfying conditional expression (2), the cemented surface can have a larger curvature radius with keeping the same refractive power. Thereby, spherical aberration occurring especially at the telephoto side can be corrected satisfactorily. It is more preferable that the second lens group satisfies the conditional expression (4).

In the aforesaid embodiment, it is preferable that the second lens group satisfies the following conditional expression.

$$0.2 < |f_2/(f_W \times f_T)^{1/2}| < 1.0 \quad (5)$$

In the expression, $f_2$ a focal length of the second lens group, $f_W$ is a focal length of a total system of the zoom lens at a wide-angle end, and $f_T$ is a focal length of the total system of the zoom lens at a telephoto end.

In the aforesaid embodiment, it is more preferable that the second lens group satisfies the following conditional expression.

$$0.2 < |f_2/(f_W \times f_T)^{1/2}| < 0.6 \quad (6)$$

In the expression, a focal length of the second lens group, $f_W$ is a focal length of the total system of the zoom lens at the wide-angle end, and $f_T$ is the focal length of the total system of the zoom lens at the telephoto end.

When the refractive power of the second lens group satisfies the conditional expression (5), it causes sufficiently reduced deterioration of optical performance due to occurrence of various aberrations and errors in decentration and in shapes, because the refractive power does not become excessively large; and it provides sufficiently small-sized lens system, because the refractive power does not become excessively small. It is more preferable that the second lens group satisfies the conditional expression (6).

In the aforesaid embodiment, it is preferable that the cemented lens in the third lens group consists of a positive lens c1, a negative lens c2, and a positive lens c3, in order from the object side, and satisfies the following conditional expressions.

$$0.1 < n_{c2} - n_{c1} \quad (7)$$

$$10 < v_{c1} - v_{c2} < 45 \quad (8)$$

In the expressions, $n_{c1}$ is a refractive index of the positive lens c1 for d-line, $n_{c2}$ is a refractive index of the negative lens c2 for d-line, $v_{c1}$ is an Abbe number of the positive lens c1, and $v_{c2}$ is an Abbe number of the negative lens c2.

In the aforesaid embodiment, it is more preferable that the cemented lens in the third lens group consists of a positive lens c1, a negative lens c2, and a positive lens c3, in order from the object side, and satisfies the following conditional expression.

$$0.25 < n_{c2} - n_{c1} \quad (9)$$

$$20 < v_{c1} - v_{c2} < 35 \quad (10)$$

In the expression, $n_{c1}$ is a refractive index of the positive lens c1 for d-line, $n_{c2}$ is a refractive index of the negative lens c2 for d-line, $v_{c1}$ is an Abbe number of the positive lens c1, and $v_{c2}$ is an Abbe number of the negative lens c2.

When the cemented lens satisfies the conditional expression (7), a difference in a refractive index between lens c1 and lens c2 in the cemented lens grows greater and a curvature radius of the cemented surface can be made gentle, thus, spherical aberration and astigmatism occurring on the cemented surface can be controlled to be small. It is more preferable that the cemented lens satisfies the conditional expression (9). When the cemented lens satisfies the conditional expression (8), longitudinal chromatic aberration and chromatic aberration of magnification occurring within the third lens group can be corrected satisfactorily. When a value of conditional expression (8) becomes the lower limit or larger, a difference in Abbe number between lens c1 and lens c2 in the cemented lens does not become too small, whereby, it is possible to ease problems that longitudinal chromatic aberration which is under-corrected for g-line compared with that for d-line, becomes excessively large, and that magnification chromatic aberration such that g-line reaches a lower image height than that of d-line, becomes excessively large. On the other hand, when a value of conditional expression (8) becomes the upper limit or smaller, a difference in Abbe number between lens c1 and lens c2 does not grow too great, whereby, it is possible to ease problems that longitudinal chromatic aberration which is over-corrected for g-line compared with that for d-line, becomes excessively large, and that magnification chromatic aberration such that g-line reaches a higher image height than that of d-line, becomes excessively large. It is more preferable that the cemented lens satisfies the conditional expression (10).

In the aforesaid embodiment, it is preferable that the cemented lens in the third lens group consists of a positive lens c1, a negative lens c2, and a positive lens c3, in order from the object side, and satisfies the following expressions.

$$0.1 < n_{c2} - n_{c3} \quad (11)$$

$$10 < v_{c3} - v_{c2} < 40 \quad (12)$$

In the expressions, $n_{c2}$ is a refractive index of the negative lens c2 for d-line, $n_{c3}$ is a refractive index of the positive lens c3 for d-line, $v_{c2}$ is an Abbe number of the negative lens c2, and $v_{c3}$ is an Abbe number of the negative lens c3.

In the aforesaid embodiment, it is more preferable that the cemented lens in the third lens group consists of a positive lens c1, a negative lens c2, and a positive lens c3, in order from the object side, and satisfies the following expressions.

$$0.2 < n_{c2} - n_{c3} \quad (13)$$

$$20 < v_{c3} - v_{c2} < 30 \quad (14)$$

In the expressions, $n_{c2}$ is a refractive index of the negative lens c2 for d-line, $n_{c3}$ is a refractive index of the positive lens c3 for d-line, $v_{c2}$ is an Abbe number of the negative lens c2, and $v_{c3}$ is an Abbe number of the positive lens c3.

When the cemented lens satisfies the conditional expression (11), a difference in a refractive index between lens c2 and lens c3 in the cemented lens grows greater, and a curvature radius of the cemented surface can be reduced, thus, spherical aberration and astigmatism occurring on the cemented surface can be controlled to be small. It is more preferable that the cemented lens satisfies the conditional expression (13). Further, when the cemented lens satisfies the conditional expression (12), longitudinal chromatic aberration and chromatic aberration of magnification occurring within the third lens group can be corrected satisfactorily. When a value of conditional expression (12) becomes the lower limit or larger, a difference in Abbe number between lens c2 and lens c3 in the cemented lens does not become too small, whereby, it is possible to ease problems that longitudinal chromatic aberration which is under-corrected for g-line compared with that for d-line, becomes excessively large, and that magnification chromatic aberration such that g-line reaches a lower image height than that of d-line, becomes excessively large. On the other hand, when a value of conditional expression (12) becomes the upper limit or smaller, a difference in Abbe number between lens c2 and lens c3 does not grow too great, whereby, it is possible to ease problems that longitudinal chromatic aberration which is over-corrected for g-line compared with that for d-line, becomes excessively large, and that magnification chromatic aberration such that g-line reaches a higher image height than that of d-line, becomes excessively large. It is more preferable that the cemented lens satisfies the conditional expression (14).

In the aforesaid embodiment, the cemented lens in the third lens group may consist of a positive lens c1, a negative lens c2, and a positive lens c3, in order from the object side, and the positive lens c1 may satisfy the following expression.

$$50 < v_{c1} < 90 \quad (15)$$

In the expression, $v_{c1}$ is an Abbe number of the positive lens c1.

In the aforesaid embodiment, it is more preferable that the lens c1 satisfies the following conditional expression.

$$60 < v_{c1} < 75 \quad (16)$$

In the expression, $v_{c1}$ is an Abbe number of the positive lens c1.

In the aforesaid embodiment, the cemented lens in the third lens group may consist of a positive lens c1, a negative lens c2, and a positive lens c3, in order from the object side, and the negative lens c2 may satisfy the following expression.

$$20 < v_{c2} < 50 \quad (17)$$

In the expression, $v_{c2}$ is an Abbe number of the negative lens c2.

In the aforesaid embodiment, it is preferable that the lens c2 satisfies the following conditional expression.

$$30 < v_{c2} < 45 \quad (18)$$

In the expression, $v_{c2}$ is an Abbe number of the negative lens c2.

In the aforesaid embodiment, the cemented lens in the third lens group may consist of a positive lens c1, a negative lens c2, and a positive lens c3, in order from the object side, and the positive lens c3 may satisfy the following expression.

$$45 < v_{c3} < 85 \quad (19)$$

In the expression, $v_{c3}$ is an Abbe number of the positive lens c3.

In the aforesaid embodiment, it is more preferable that the lens c3 satisfies the following conditional expression.

$$50 < v_{c3} < 70 \quad (20)$$

In the expression, $v_{c3}$ is an Abbe number of the positive lens c3.

When the cemented lens in the third lens group satisfies conditional expressions (15), (17) and (19), longitudinal chromatic aberration and chromatic aberration of magnification occurring within the third lens group can be corrected satisfactorily. When values of conditional expressions (15) and (19) become the lower limit or greater, the Abbe numbers of the first lens and the third lens in the cemented lens do not become too small, whereby, it is possible to ease problems that longitudinal chromatic aberration which is under-corrected for g-line compared with that for d-line, becomes excessively large, and that magnification chromatic aberration such that g-line reaches a lower image height than that of d-line, becomes excessively large. On the other hand, when a value of each of conditional expressions (15) and (19) becomes the upper limit or smaller, the Abbe numbers of the first lens and the third lens in the cemented lens do not grow too great, whereby, it is possible to ease problems that longitudinal chromatic aberration which is over-corrected for g-line compared with that for d-line, becomes excessively large, and that magnification chromatic aberration such that g-line reaches a higher image height than that of d-line, becomes excessively large. Further, when a value of conditional expression (17) becomes the upper limit or lower, the Abbe number of the second lens in the cemented lens does not grow too great, whereby, it is possible to ease problems that longitudinal chromatic aberration which is under-corrected for g-line compared with that for d-line, becomes excessively large, and that magnification chromatic aberration such that g-line reaches a lower image height than that of d-line, becomes excessively large. On the other hand, when a value of conditional expression (17) becomes the lower limit or greater, the Abbe number of the second lens in the cemented lens does not become too small, whereby, it is possible to ease problems that longitudinal chromatic aberration which is over-corrected for g-line compared with that for d-line, becomes excessively large, and that magnification chromatic aberration such that g-line reaches a higher image height than that of d-line, becomes excessively large. It is more preferable that the cemented lens satisfies the conditional expressions (16), (18) and (20).

In the aforesaid embodiment, it is preferable that the third lens group satisfies the following conditional expression.

$$0.3 < f_3/(f_W \times f_T)^{1/2} < 1 \tag{21}$$

In the expression, $f_3$ is a focal length of the third lens group, $f_W$ is a focal length of a total system of the zoom lens at a wide-angle end, and $f_T$ is a focal length of the total system of the zoom lens at a telephoto end.

In the aforesaid embodiment, it is more preferable that the third lens group satisfies the following conditional expression.

$$0.4 < f_3/(f_W \times f_T)^{1/2} < 0.8 \tag{22}$$

In the expression, $f_3$ is a focal length of the third lens group, $f_W$ is a focal length of a total system of the zoom lens at a wide-angle end, and $f_T$ is a focal length of the total system of the zoom lens at a telephoto end.

When the refractive power of the third lens group satisfies the conditional expression (21), it causes sufficiently reduced deterioration of optical performance due to occurrence of various aberrations and errors in decentration and in shapes become too great, because the refractive power does not become excessively large; and it provides sufficiently small-sized zoom lens, because the refractive power does not become excessively small. It is more preferable that the third lens group satisfies the conditional expression (22).

In the aforesaid embodiment, it is preferable that the fourth lens group consists of one plastic aspheric lens and satisfies the following conditional expression.

$$|(f_W \times f_T)^{1/2}/f_4| < 2 \tag{23}$$

In the expression, $f_4$ is a focal length of the fourth lens group, $f_W$ is a focal length of a total system of the zoom lens at a wide-angle end, and $f_T$ is a focal length of the total system of the zoom lens at a telephoto end.

In the aforesaid embodiment, it is more preferable that the fourth lens group consists of one plastic aspheric lens and satisfies the following conditional expression.

$$|(f_W \times f_T)^{1/2}/f_4| < 1.5 \tag{24}$$

In the expression, $f_4$ is a focal length of the fourth lens group, $f_W$ is a focal length of a total system of the zoom lens at a wide-angle end, and $f_T$ is a focal length of the total system of the zoom lens at a telephoto end.

By forming the fourth lens group as a plastic lens, it can easily form an aspheric surface that is effective for correcting astigmatism. Further, it can reduce the weight of the fourth lens group that is movable for zooming and focusing, thereby, a load for a drive mechanism can be controlled to be small. In addition, plastic lenses can be produced through injection molding on a mass production basis, and they can contribute to cost reduction. Refractive index and a shape of a plastic lens are fluctuated by temperature changes. However, it refractive power of the plastic lens is kept within a range of conditional expression (23), it is possible to reduce changes of optical performances caused by the aforesaid refractive index and shapes. It is more preferable that the fourth lens group satisfies the conditional expression (24).

In the aforesaid embodiment, it is preferable that the fifth lens group consists of one plastic aspheric lens and satisfies the following conditional expression.

$$(f_W \times f_T)^{1/2}/f_5 < 2 \tag{25}$$

In the expression, $f_5$ is a focal length of the fifth lens group, $f_W$ is a focal length of a total system of the zoom lens at a wide-angle end, and $f_T$ is a focal length of the total system of the zoom lens at a telephoto end.

In the aforesaid embodiment, it is more preferable that the fifth lens group consists of one plastic aspheric lens and satisfies the following conditional expression.

$$(f_W \times f_T)^{1/2}/f_5 < 1.3 \tag{26}$$

In the expression, is a focal length of the fifth lens group, $f_W$ is a focal length of a total system of the zoom lens at a wide-angle end, and $f_T$ is a focal length of the total system of the zoom lens at a telephoto end.

By forming the fifth lens group as a single plastic aspheric lens, it is possible to correct aberrations such as distortion effectively despite a simple structure, and to contribute to weight reduction and cost reduction of the lens unit. Further, when the fifth lens group satisfies the conditional expression (25), changes of optical performance caused by temperature changes can be controlled to be small. It is more preferable that the fifth lens group satisfies the conditional expression (26).

In the aforesaid embodiment, it is preferable that the zoom lens adjusts a focus from an object at an infinity to an object at a finite distance by moving the forth lens group.

The present zoom lens employs so-called rear-focus system that the fourth lens group is moved toward the image side when the focal point is adjusted from an object at the infinity to an object at the near distance. In a zoom lens in which the first lens group is moved for adjusting the focal point, a load for the drive mechanism turns out to be great, because this lens group is great in terms of a lens diameter and is heavy in terms of weight. Further, in the zoom lens in which the first lens is moved for adjusting the focal point, a diameter of the front lens group becomes greater for securing relative illumination when the first lens group moves for adjusting the focal point to the near distance. However, these phenomena do not occur in the zoom lens employing the fourth group for adjusting the focal point. Therefore, it is possible to realize a zoom lens that is excellent in compactness, with less power consumption and with a simple structure.

In the aforesaid embodiment, it is preferable that the fifth lens group is statically positioned for varying the power of the zoom lens.

By fixing the fifth lens group in the course of zooming, it is possible to more securely seal the vicinity of an image sensor, and to prevent dust and dirt from entering the image sensor.

EXAMPLES

Examples 1, 2, and 3 will be explained below, referring to the drawings.

Figure 1:
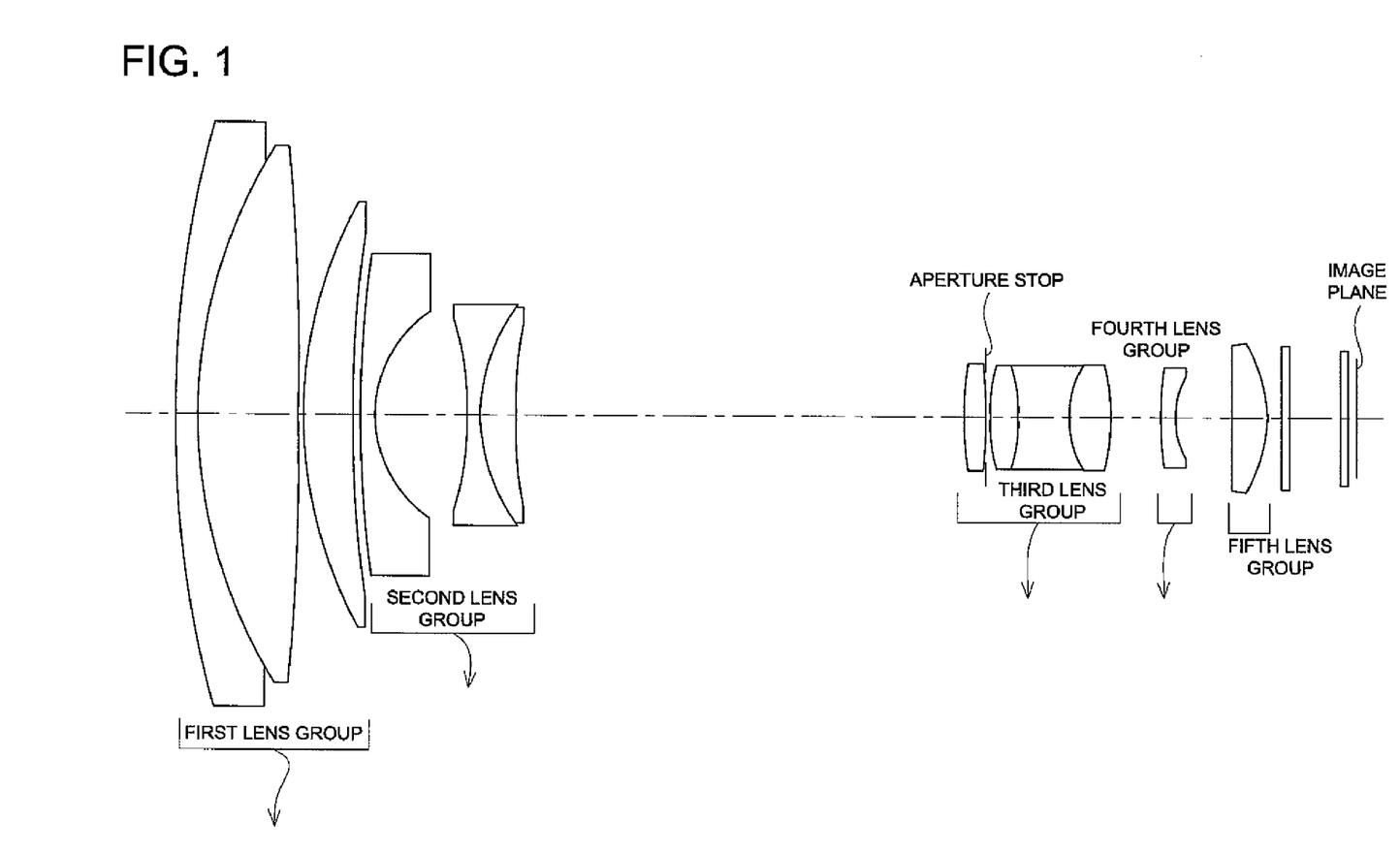
FIG. 1 is a diagram of a lens structure of a wide-angle end of Example 1.
Figure 2:
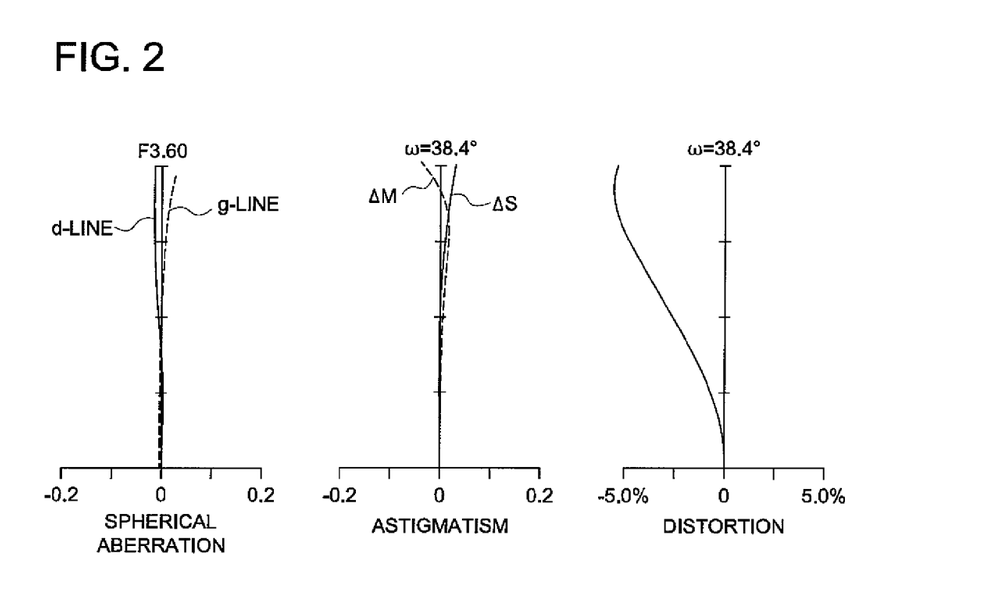
FIG. 2 is a diagram of aberrations at a wide-angle end of Example 1.
Figure 3:
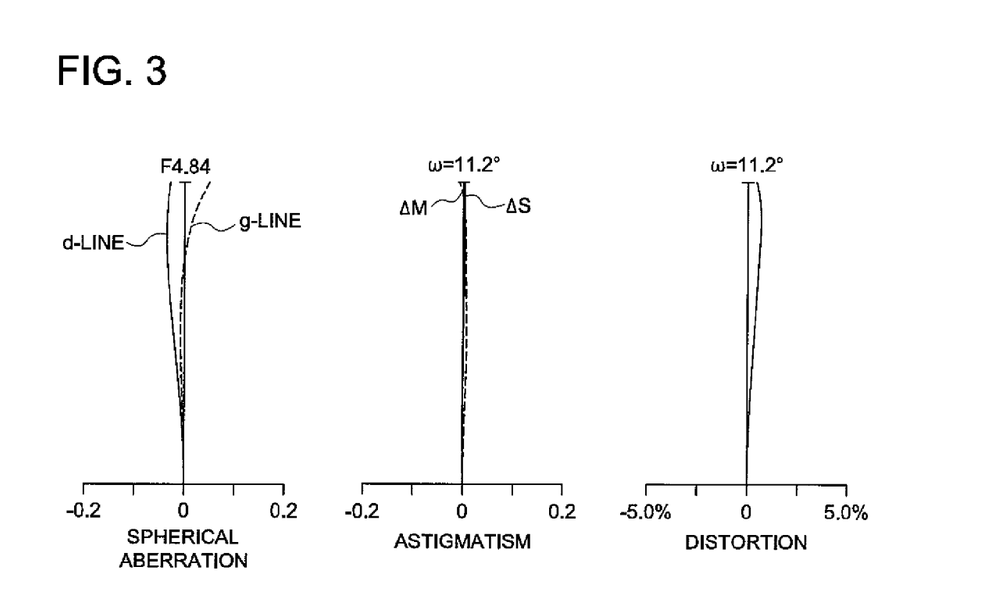
FIG. 3 is a diagram of aberrations at an intermediate focal length of Example 1.
Figure 4:
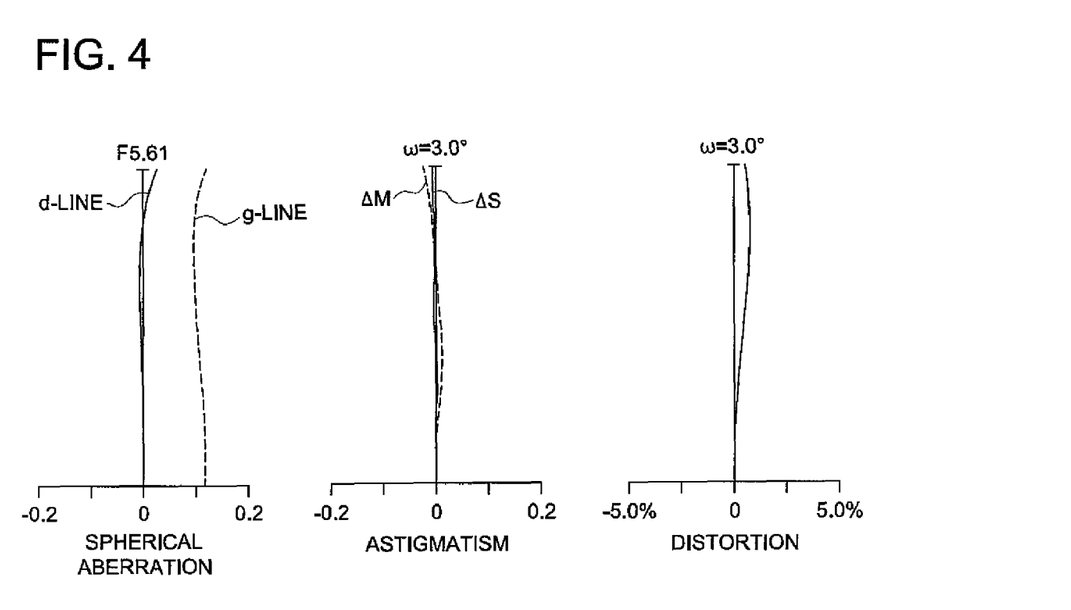
FIG. 4 is a diagram of aberrations at a telephoto end of Example 1.
Figure 5:
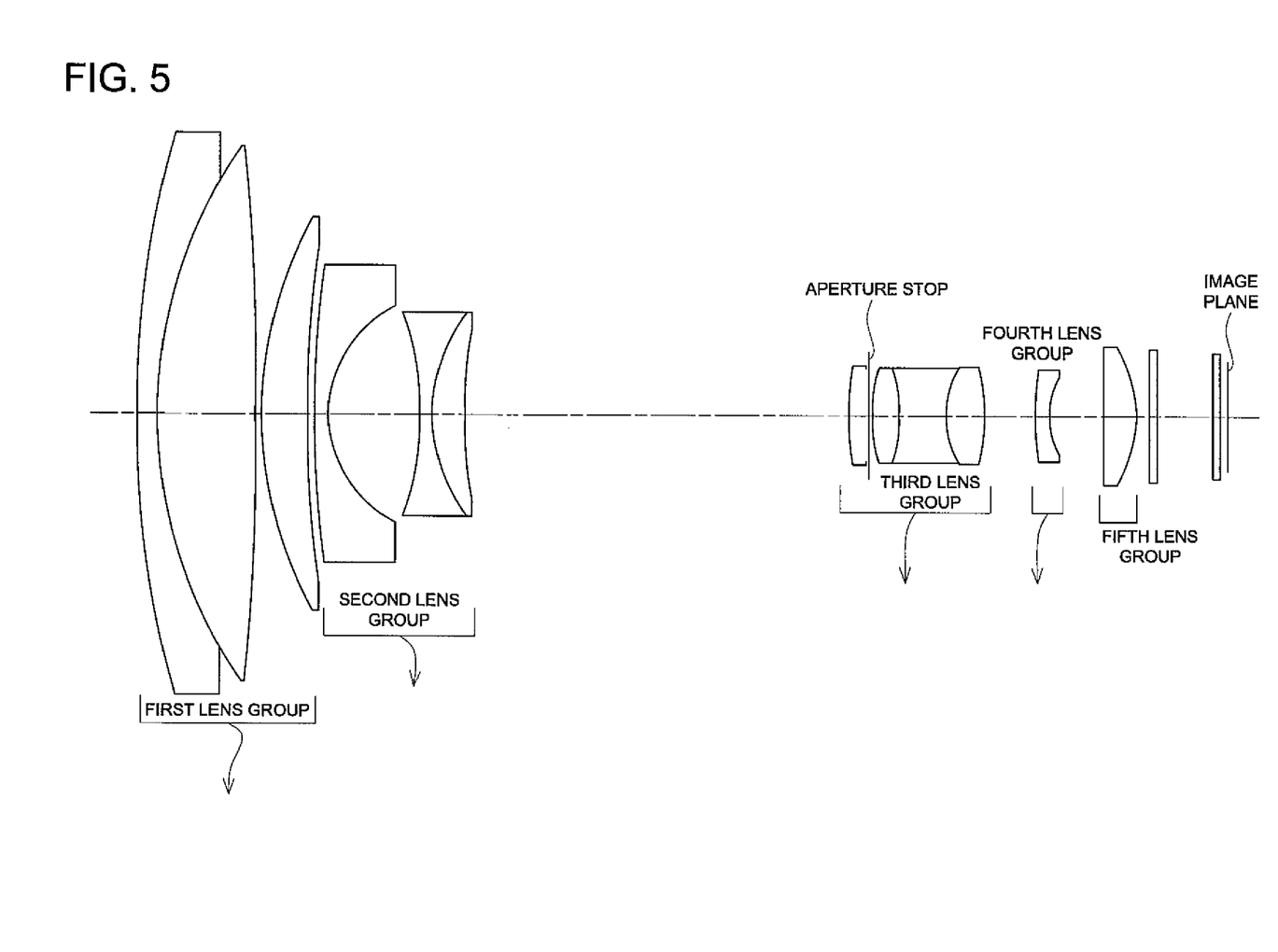
FIG. 5 is a diagram of a lens structure of a wide-angle end of Example 2.
Figure 6:
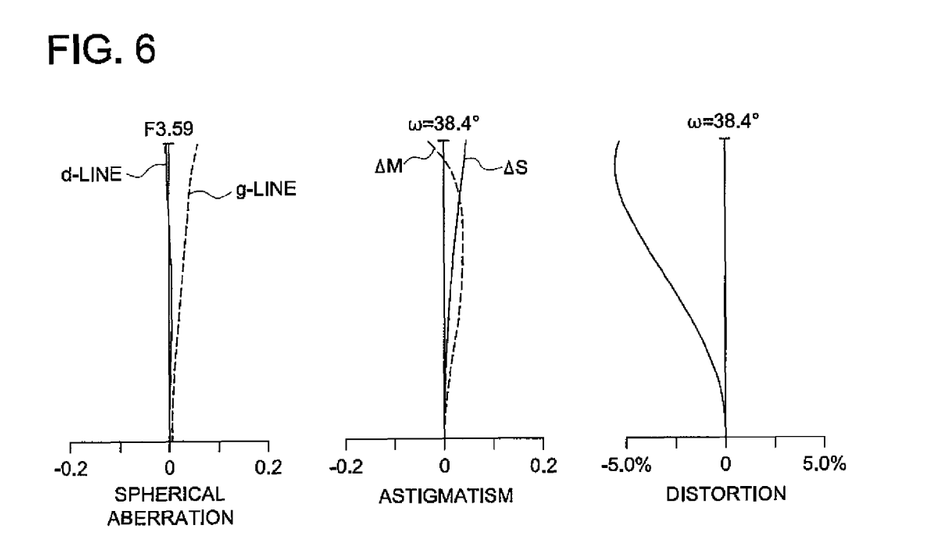
FIG. 6 is a diagram of aberrations at a wide-angle end of Example 2.
Figure 7:
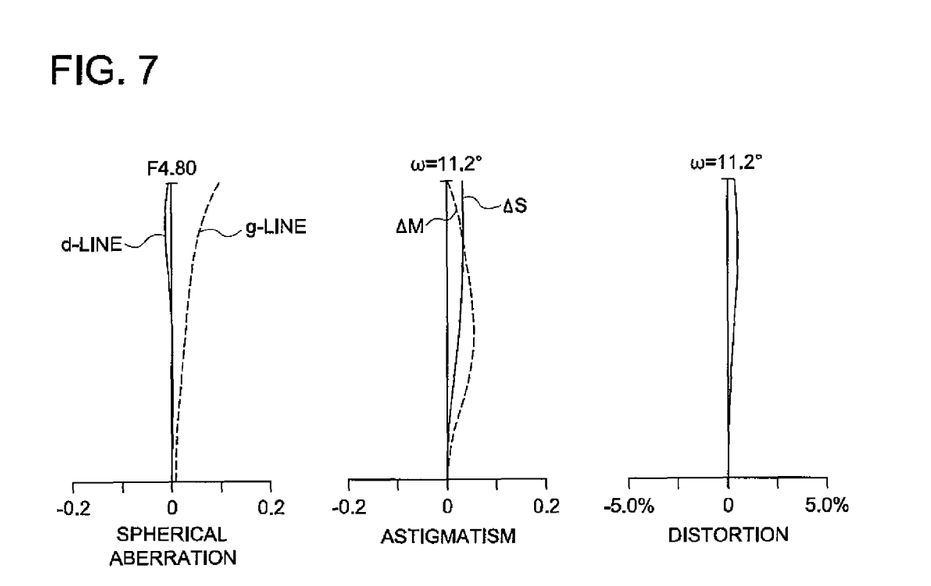
FIG. 7 is a diagram of aberrations at an intermediate focal length of Example 2.
Figure 8:
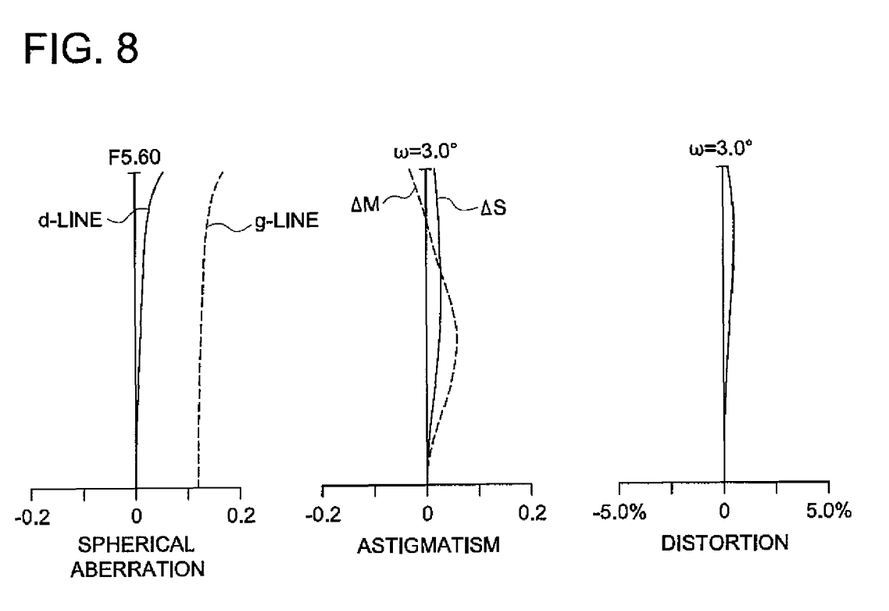
FIG. 8 is a diagram of aberrations at a telephoto end of Example 2.
Figure 9:
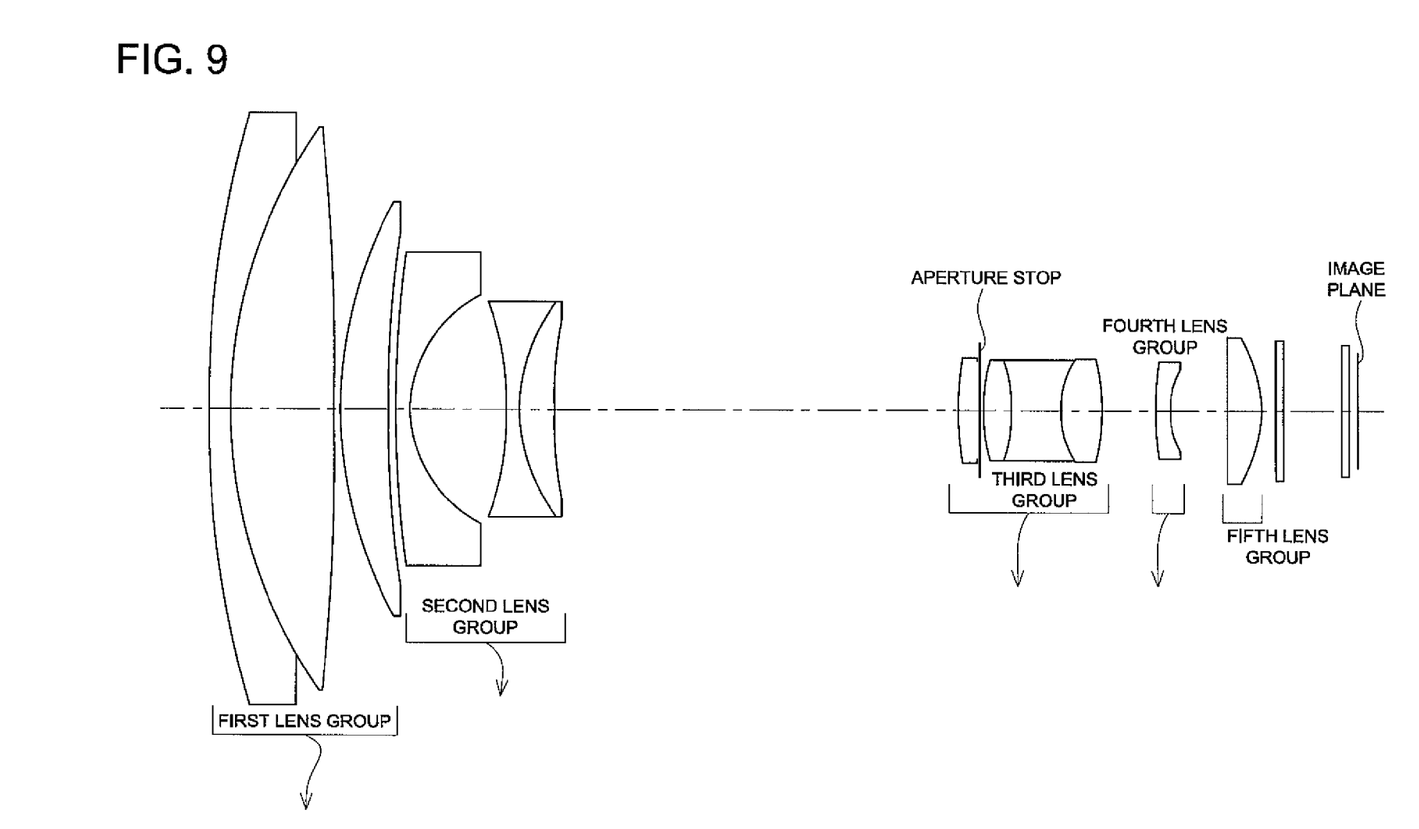
FIG. 9 is a diagram of a lens structure of a wide-angle end of Example 3.
Figure 10:
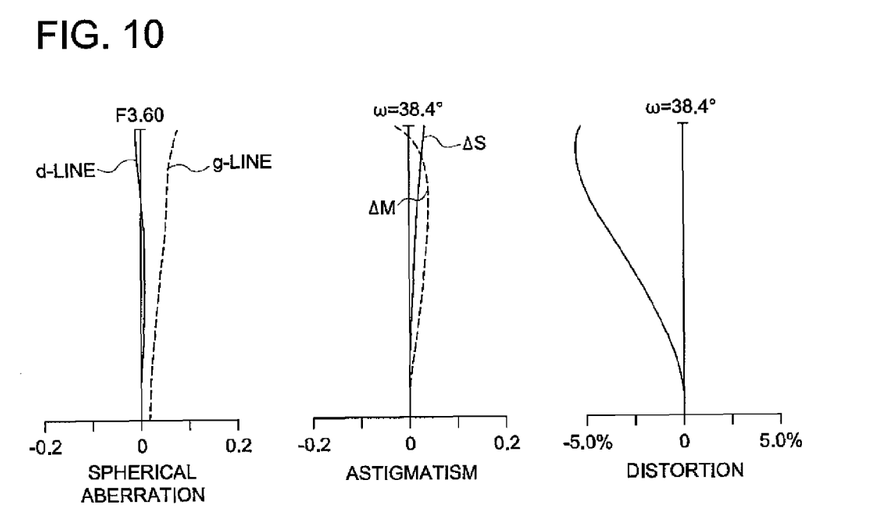
FIG. 10 is a diagram of aberrations at a wide-angle end of Example 3.
Figure 11:
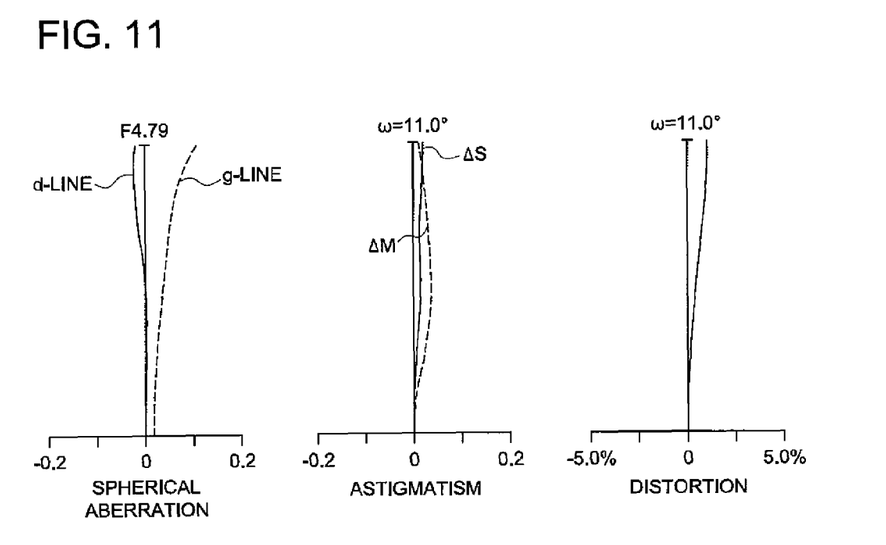
FIG. 11 is a diagram of aberrations at an intermediate focal length of Example 3.
Figure 12:
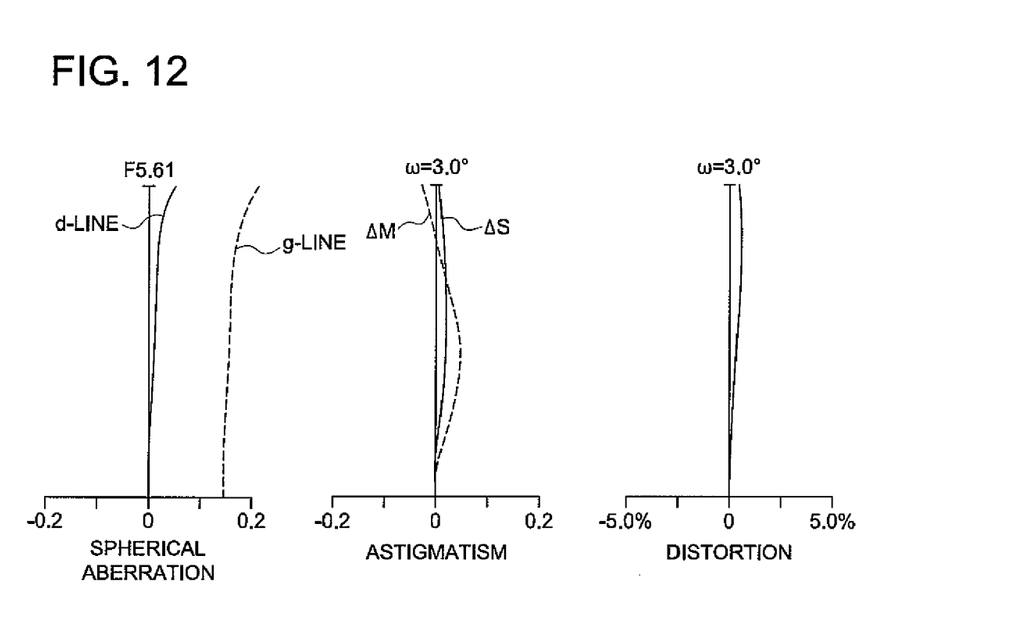
FIG. 12 is a diagram of aberrations at a telephoto end of Example 3.

Each of FIGS. 1, 5 and 9 is a diagram of a lens structure at the wide-angle end of each of Examples 1-3. FIGS. 2, 3 and 4 are aberration diagrams of the zoom lens of Example 1 at the wide-angle end, an intermediate focal length and the telephoto end, respectively. FIGS. 6, 7 and 8 are aberration diagrams of the zoom lens of Example 2 at the wide-angle end, an intermediate focal length and a telephoto end, respectively. FIGS. 10, 11, and 12 are aberration diagrams of the zoom lens of Example 3 at the wide-angle end, the intermediate focal length and the telephoto end, respectively.

Each of zoom lenses of Examples 1, 2, and 3 includes the first lens group with positive refractive power, the second lens group with negative refractive power, the third lens group with positive refractive powers the fourth lens group with negative refractive power, and the fifth lens group with positive refractive power, in this order from the object side. The zoom lens forms an optical image of the object onto an image plane with the power variable. The power of the zoom lens is varied by changing a distance between lens groups. Each of FIGS. 1, 5 and 9 shows loci of movements of the first lens group through the fourth lens group when the power varies from the wide-angle end (W) to the telephoto end (T) of each of Examples 1, 2, and 3 by using curved arrows schematically. Incidentally, the fifth lens group is statically positioned for varying the power of the zoom lens. In the zoom lenses in Examples 1, 2, 3, there is employed the so-called rear focus system which means that the fourth lens group moves toward the image side when the focal point is adjusted from an object at the infinity distance to an object at a near distance.

In Examples 1, 2, and 3, the first lens group through the fourth lens group move to vary the power and to correct a shift of the focal point, thereby, a zoom lens that is compact in terms of a total length and a diameter of a front lens, is attained.

In Examples 1, 2, and 3, the second lens group is composed of a negative single lens and of a cemented lens including a negative lens and a positive lens. By using the cemented lens, the number of elements in the lens group can be reduced to be 2, man hour for assembling lenses in a lens barrel is less than that in the case where all lenses in the second lens group are a single lens, and errors in lens interval and errors in decentration caused in the course of assembling lenses can be reduced. It realizes lenses which exhibit easy production control.

Further, the third lens group is composed of one positive single lens and of a cemented lens formed of three lenses: a positive lens, a negative lens, and a positive lens. By reducing the number of elements of the third lens group to be 2, man hour for assembling lenses in a lens barrel is less and errors in lens interval and errors in decentration caused in the course of assembling lenses can be reduced. It realizes lenses which exhibit easy production control.

Further, an aperture stop is arranged in the third lens group. By arranging the aperture stop around the third lens group which corresponds to the substantially central position of the present zoom lens, refractive powers of lenses can be distributed mostly symmetrically, and aberrations can be corrected in excellent condition. It enables to correct various aberrations in excellent condition and to secure a telecentricity required by CCD and CMOS optical systems, compatibly.

Further, by arranging an aperture stop in the third lens group, a space between the second lens group and the third lens group at a telephoto end can be made to be smaller than that in the case where the stop is closer to the object side than the third lens group is, and thereby, a height of incident light for the third lens group and a width of the light flux can be controlled to be small, and a load of aberration correction in the third lens group can be reduced. Since the third lens group is closest to the aperture stop, and on-axis and off-axis light fluxes passing through this portion have relatively large diameter, the third lens group is easily affected by an influence of errors in lens surface form in the present zoom lens. Therefore, it is preferable to arrange a polished glass lens in which undulation errors on the surface can easily be controlled to be small. Even in the case of using a molded aspheric lens for correcting spherical aberration and astigmatism satisfactorily, the undulation errors naturally need to be controlled to be small.

Meanwhile, in Examples 1, 2, and 3, each of the fourth lens group and the fifth lens group is composed of one plastic aspheric lens. Even when a molded-glass aspheric lens or a hybrid aspheric lens other than the plastic aspheric lens is used for both the fourth lens group and the fifth lens group, optical properties can also be obtained in excellent condition.

Further, in each Example, a lowpass filter and a cover glass are arranged behind the final surface of the lens system in this order. When an infrared ray cutting filter is provided as a reflection type that a surface of the lowpass filter is coated, an additional filter glass for cutting a infrared ray of an absorption type is not needed to be insert to the zoom lens. Therefore, the dimension of the zoom lens along the optical axis can be shortened and it provides an advantageous structure for compactness.

According to the zoom lens of the embodiment of the present invention, a cemented lens is used for each of the second lens group and the third lens group of the zoom lens which includes a positive lens group, a negative lens group, a positive lens group, a negative lens group, a positive lens group. Thereby, the number of elements in a lens group of the zoom lens can be reduced, assembling of the zoom lens becomes easy, the size of the zoom lens becomes compact, and the zoom lens exhibits a wide angle of view and a high variable-power ratio, and various aberrations are corrected satisfactorily.

Lens data of the zoom lens in Examples 1, 2, and 3 are shown below.

Lens data show the following symbols.

f: Focal length of the total systems of the zoom lens

F: F number $\omega$: Half angle-of-view

R: Curvature radius d: Lens interval $n_d$: Refractive index for d-line $v_d$: Abbe number

*: Aspheric surface

A form of an aspheric surface is indicated by the following expression (27), where the tip of the surface is on the origin, an X-axis extends along the optical axis direction, and h represents a height in the direction perpendicular to the optical axis.

$$X = \frac{h^2/R}{1 + \sqrt{1-(1+K)h^2/R^2}} + \sum A_i h^i \quad (27)$$

In the expression, $A_i$ represents $i^{th}$ order aspheric surface coefficient, R represents a curvature radius and K represent a conic constant.

Example 1

Table 1 shows lens surface data in Example 1. The eleventh lens formed by the eighteenth and nineteenth lens surfaces and the twelfth lens formed by the twentieth and twenty-first lens surfaces are plastic lenses.

TABLE 1

Lens surface data

| Surface No. | R (mm) | d (mm) | $n_d$ | $v_d$ |
|---|---|---|---|---|
| 1 | 62.409 | 1.50 | 1.84666 | 23.8 |
| 2 | 31.649 | 6.83 | 1.48749 | 70.4 |
| 3 | −242.081 | 0.20 | | |
| 4 | 27.143 | 3.31 | 1.80400 | 46.6 |
| 5 | 76.401 | d1 (Variable) | | |
| 6 | 76.322 | 0.90 | 1.83481 | 42.7 |
| 7 | 8.212 | 6.17 | | |
| 8 | −21.773 | 0.80 | 1.51742 | 52.4 |
| 9 | 11.751 | 2.33 | 1.92286 | 20.9 |
| 10 | 33.576 | d2 (Variable) | | |
| 11 | 20.098 | 1.42 | 1.88300 | 40.8 |
| 12 | −64.636 | 0.05 | | |
| 13 (Aperture) | ∞ | 0.20 | | |
| 14 | 11.499 | 1.93 | 1.48749 | 70.2 |
| 15 | −13.500 | 3.32 | 1.80440 | 39.6 |
| 16 | 7.110 | 2.80 | 1.58913 | 61.2 |
| 17 | −13.948 | d3 (Variable) | | |
| 18* | 23.673 | 1.00 | 1.60700 | 27.0 |
| 19* | 6.255 | d4 (Variable) | | |
| 20* | −29.741 | 2.31 | 1.52500 | 56.0 |
| 21* | −7.425 | 1.00 | | |
| 22 | ∞ | 0.50 | 1.52310 | 54.0 |
| 23 | ∞ | 3.34 | | |
| 24 | ∞ | 0.50 | 1.51680 | 64.2 |
| 25 | ∞ | | | |

Table 2 shows aspheric surface coefficients in Example 1.

TABLE 2

Aspheric surface coefficients

| $18^{th}$ surface | K = 0 |
| | A4 = −1.14030E−03 |
| | A6 = 1.12484E−04 |
| | A8 = −1.69564E−05 |
| | A10 = 1.08444E−06 |
| | A12 = −9.70041E−10 |
| $19^{th}$ surface | K = 0 |
| | A4 = −8.26319E−04 |
| | A6 = 1.42872E−04 |
| | A8 = −2.15741E−05 |
| | A10 = 1.25402E−06 |
| | A12 = 7.89504E−09 |
| $20^{th}$ surface | K = 0 |
| | A4 = 4.27228E−04 |
| | A6 = 4.59533E−05 |
| | A8 = −1.63448E−06 |
| | A10 = 2.11735E−08 |
| | A12 = −2.63097E−10 |
| | A14 = −1.32917E−12 |
| $21^{st}$ surface | K = 0 |
| | A4 = 5.83563E−04 |
| | A6 = 2.21499E−05 |
| | A8 = 1.88050E−07 |
| | A10 = −2.43048E−08 |
| | A12 = 1.21195E−10 |
| | A14 = −8.82133E−13 |

Table 3 shows various types of data in the case of varying the power of the zoom lens of Example 1.

TABLE 3

Zoom ratio: 14.27

| | Wide-angle end | Intermediate | Telephoto end |
|---|---|---|---|
| Focal length | 5.15 | 19.40 | 73.50 |
| F number | 3.60 | 4.84 | 5.61 |
| Half angle-of-view | 38.4 | 11.2 | 3.0 |
| Image height | 3.86 | 3.86 | 3.86 |
| Total lens length | 81.47 | 82.67 | 82.76 |
| Back focal length | 5.61 | 5.62 | 5.61 |
| d1 | 0.600 | 14.934 | 25.206 |
| d2 | 33.198 | 14.259 | 0.867 |
| d3 | 3.300 | 5.150 | 7.307 |
| d4 | 3.700 | 7.642 | 8.702 |

Table 4 shows data of lens groups of the zoom lens of Example 1.

TABLE 4

| Group | Front surface number | Focal length |
|---|---|---|
| 1 | 1 | 44.68 |
| 2 | 6 | −8.47 |
| 3 | 11 | 12.19 |
| 4 | 18 | −14.32 |
| 5 | 20 | 18.20 |

Table 5 shows shift amount of the focal point of the zoom lens caused by temperature changes in plastic lenses in Example 1.

TABLE 5

| | Wide-angle end | Intermediate | Telephoto end |
|---|---|---|---|
| f | 5.15 | 19.40 | 73.50 |
| Shift amount of focal point | −0.034 | −0.064 | −0.074 |

Values corresponding to the conditional expressions in Example 1 are listed below:

$n_{n1} = 1.83481$ $n_{p1} - n_{n2} = 0.41$ $|f_2/(f_W \times f_T)^{1/2}| = 0.44$ $n_{c2} - n_{c1} = 0.32$ $v_{c1} - v_{c2} = 30.2$ $n_{c2} - n_{c3} = 0.22$ $v_{c3} - v_{c2} = 21.6$ $v_{c1} = 70.2$ $v_{c2} = 39.6$ $v_{c3} = 61.2$ $f_3/(f_W \times f_T)^{1/2}=0.63$ $|(f_W \times f_T)^{1/2}/f_4|=1.36$ $(f_W \times f_T)^{1/2}/f_5=1.07$

Example 2

Table 6 shows lens surface data in Example 2. The eleventh lens formed by the eighteenth and nineteenth lens surfaces and the twelfth lens formed by the twentieth and twenty-first lens surfaces are plastic lenses.

TABLE 6

Lens surface data

| Surface No. | R (mm) | d (mm) | $n_d$ | $v_d$ |
|---|---|---|---|---|
| 1 | 68.546 | 1.50 | 1.84666 | 23.8 |
| 2 | 31.546 | 6.85 | 1.48749 | 70.4 |
| 3 | −240.035 | 0.20 | | |
| 4 | 26.948 | 3.33 | 1.80400 | 46.6 |
| 5 | 73.546 | d1 (Variable) | | |
| 6 | 73.546 | 0.90 | 1.83481 | 42.7 |
| 7 | 8.155 | 6.17 | | |
| 8 | −20.920 | 0.80 | 1.51742 | 52.4 |
| 9 | 11.694 | 2.31 | 1.92286 | 20.9 |
| 10 | 33.778 | d2 (Variable) | | |
| 11 | 21.169 | 1.37 | 1.88300 | 40.8 |
| 12 | −69.694 | 0.20 | | |
| 13 (Aperture) | ∞ | 0.05 | | |
| 14 | 11.835 | 2.17 | 1.51633 | 64.2 |
| 15 | −11.835 | 3.05 | 1.80440 | 39.6 |
| 16 | 7.249 | 2.74 | 1.58913 | 61.2 |
| 17 | −13.002 | d3 (Variable) | | |
| 18* | 25.791 | 1.00 | 1.60700 | 27.0 |
| 19* | 6.541 | d4 (Variable) | | |
| 20* | −27.641 | 2.21 | 1.52500 | 56.0 |
| 21* | −7.588 | 1.00 | | |
| 22 | ∞ | 0.50 | 1.52310 | 54.0 |
| 23 | ∞ | 3.69 | | |
| 24 | ∞ | 0.50 | 1.51680 | 64.2 |
| 25 | ∞ | | | |

Table 7 shows aspheric surface coefficients in Example 2.

TABLE 7

Aspheric surface coefficients

| $18^{th}$ surface | K = 0 |
| | A4 = −1.21253E−03 |
| | A6 = 2.22342E−04 |
| | A8 = −4.02745E−05 |
| | A10 = 3.23933E−06 |
| | A12 = −6.79369E−08 |
| $19^{th}$ surface | K = 0 |
| | A4 = −7.25511E−04 |
| | A6 = 1.79029E−04 |
| | A8 = −2.25504E−05 |
| | A10 = 3.63140E−07 |
| | A12 = 9.66694E−08 |
| $20^{th}$ surface | K = 0 |
| | A4 = 4.86908E−04 |
| | A6 = 5.61340E−05 |
| | A8 = −1.98535E−06 |
| | A10 = 2.35391E−08 |
| | A12 = −1.35935E−10 |
| | A14 = 1.80769E−12 |
| $21^{st}$ surface | K = 0 |
| | A4 = 5.85782E−04 |
| | A6 = 2.83574E−05 |

TABLE 7-continued

Aspheric surface coefficients

| | A8 = 9.16340E−08 |
| | A10 = −8.40465E−09 |
| | A12 = −1.21404E−09 |
| | A14 = 3.31947E−11 |

Table 8 shows various types of data in the case of varying the power of the zoom lens of Example 2.

TABLE 8

Zoom ratio: 14.27

| | Wide-angle end | Intermediate | Telephoto end |
|---|---|---|---|
| Focal length | 5.15 | 19.40 | 73.50 |
| F number | 3.59 | 4.80 | 5.60 |
| Half angle-of-view | 38.4 | 11.2 | 3.0 |
| Image height | 3.86 | 3.86 | 3.86 |
| Total lens length | 81.08 | 82.50 | 83.09 |
| Back focal length | 5.95 | 5.96 | 5.95 |
| d1 | 0.600 | 15.033 | 25.280 |
| d2 | 32.658 | 13.902 | 0.867 |
| d3 | 3.298 | 5.219 | 7.285 |
| d4 | 3.702 | 7.524 | 8.846 |

Table 9 shows data of lens groups of the zoom lens of Example 2.

TABLE 9

| Group | Front surface number | Focal length |
|---|---|---|
| 1 | 1 | 44.76 |
| 2 | 6 | −8.38 |
| 3 | 11 | 12.16 |
| 4 | 18 | −14.73 |
| 5 | 20 | 19.19 |

Table 10 shows shift amount of the focal point of the zoom lens caused by temperature changes in plastic lenses in Example 2.

TABLE 10

| | Wide-angle end | Intermediate | Telephoto end |
|---|---|---|---|
| f | 5.15 | 19.40 | 73.50 |
| Shift amount of focal point | −0.035 | −0.064 | −0.075 |

Values corresponding to the conditional expressions in Example 2 are listed below:

$n_{n1}=1.83481$ $n_{p1}-n_{n2}=0.41$ $|f_2/(f_W \times f_T)^{1/2}|=0.43$ $n_{c2}-n_{c1}=0.29$ $v_{c1}-v_{c2}=24.6$ $n_{c2}-n_{c3}=0.22$ $v_{c3} - v_{c2} = 21.6$ $v_{c1} = 64.2$ $v_{c2} = 39.6$ $v_{c3} = 61.2$ $f_3/(f_W \times f_T)^{1/2} = 0.62$ $|(f_W \times f_T)^{1/2}/f_4| = 1.32$ $(f_W \times f_T)^{1/2}/f_5 = 1.01$ Example 3

Table 11 shows lens surface data in Example 3. The eleventh lens formed by the eighteenth and nineteenth lens surfaces and the twelfth lens formed by the twentieth and twenty-first lens surfaces are plastic lenses.

TABLE 11

Surface lens data

| Surface No. | R (mm) | d (mm) | $n_d$ | $v_d$ |
|---|---|---|---|---|
| 1 | 68.814 | 1.50 | 1.84666 | 23.8 |
| 2 | 31.560 | 6.81 | 1.48749 | 70.4 |
| 3 | −244.308 | 0.20 | | |
| 4 | 27.590 | 3.33 | 1.80400 | 46.6 |
| 5 | 80.342 | d1 (Variable) | | |
| 6 | 81.585 | 0.90 | 1.83481 | 42.7 |
| 7 | 8.243 | 6.10 | | |
| 8 | −21.408 | 0.80 | 1.51742 | 52.4 |
| 9 | 11.472 | 2.37 | 1.92286 | 20.9 |
| 10 | 32.598 | d2 (Variable) | | |
| 11 | 24.128 | 1.31 | 1.88300 | 40.8 |
| 12 | −70.569 | 0.20 | | |
| 13 (Aperture) | ∞ | 0.05 | | |
| 14 | 11.082 | 2.36 | 1.51633 | 64.2 |
| 15 | −11.082 | 2.95 | 1.80611 | 40.7 |
| 16 | 7.215 | 2.39 | 1.58913 | 61.2 |
| 17 | −11.950 | d3 (Variable) | | |
| 18* | 33.591 | 1.00 | 1.60700 | 27.0 |
| 19* | 7.201 | d4 (Variable) | | |
| 20* | −39.371 | 2.31 | 1.52500 | 56.0 |
| 21* | −8.515 | 1.00 | | |
| 22 | ∞ | 0.50 | 1.52310 | 54.0 |
| 23 | ∞ | 4.41 | | |
| 24 | ∞ | 0.50 | 1.51680 | 64.2 |
| 25 | ∞ | | | |

Table 12 shows aspheric surface coefficients in Example 3.

TABLE 12

Aspheric surface coefficients

| $18^{th}$ surface | K = 0 |
| | A4 = −1.26930E−03 |
| | A6 = 2.61822E−04 |
| | A8 = −4.38475E−05 |
| | A10 = 3.41503E−06 |
| | A12 = −7.49444E−08 |
| $19^{th}$ surface | K = 0 |
| | A4 = −8.32740E−04 |
| | A6 = 2.21082E−04 |
| | A8 = −2.51488E−05 |
| | A10 = 4.10754E−07 |
| | A12 = 9.16286E−08 |

TABLE 12-continued

Aspheric surface coefficients

| $20^{th}$ surface | K = 0 |
| | A4 = 5.47686E−04 |
| | A6 = 4.87263E−05 |
| | A8 = −1.29603E−06 |
| | A10 = 1.05508E−08 |
| | A12 = −2.56629E−10 |
| | A14 = 1.92806E−11 |
| $21^{st}$ surface | K = 0 |
| | A4 = 5.70308E−04 |
| | A6 = 2.93265E−05 |
| | A8 = 1.39433E−08 |
| | A10 = 1.30545E−08 |
| | A12 = −2.21295E−09 |
| | A14 = 6.30045E−11 |

Table 13 shows various types of data in the case of varying the power of the zoom lens of Example 3.

TABLE 13

Zoom ratio: 14.27

| | Wide-angle end | Intermediate | Telephoto end |
|---|---|---|---|
| Focal length | 5.15 | 19.57 | 73.50 |
| F number | 3.60 | 4.79 | 5.61 |
| Half angle-of-view | 38.4 | 11.0 | 3.0 |
| Image height | 3.86 | 3.86 | 3.86 |
| Total lens length | 81.29 | 82.65 | 83.61 |
| Back focal length | 6.43 | 6.45 | 6.44 |
| d1 | 0.612 | 15.088 | 25.236 |
| d2 | 32.669 | 13.664 | 0.872 |
| d3 | 3.298 | 5.315 | 7.186 |
| d4 | 3.700 | 7.558 | 9.302 |

Table 14 shows data of lens groups of the zoom lens of Example 3.

TABLE 14

| Group | Front surface | Focal length |
|---|---|---|
| 1 | 1 | 44.59 |
| 2 | 6 | −8.40 |
| 3 | 11 | 12.21 |
| 4 | 18 | −15.32 |
| 5 | 20 | 20.18 |

Table 15 shows shift amount of the focal point of the zoom lens caused by temperature changes in plastic lenses in Example 3.

TABLE 15

| | Wide-angle end | Intermediate | Telephoto end |
|---|---|---|---|
| f | 5.15 | 19.57 | 73.50 |
| Shift amount of focal point | −0.036 | −0.065 | −0.080 |

Values corresponding to the conditional expressions in Example 3 are listed below:

$n_{n1} = 1.83481$ $n_{p1} - n_{n2} = 0.41$ $|f_2/(f_W \times f_T)^{1/2}|=0.43$ $n_{c2}-n_{c1}=0.29$ $v_{c1}-v_{c2}=23.5$ $n_{c2}-n_{c3}=0.22$ $v_{c3}-v_{c2}=20.5$ $v_{c1}=64.2$ $v_{c2}=40.7$ $v_{c3}=61.2$ $f_3/(f_W \times f_T)^{1/2}=0.63$ $|(f_W \times f_T)^{1/2}/f_4|=1.27$ $(f_W \times f_T)^{1/2}/f_5=0.96$ Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein. In the meantime, a zoom lens in each embodiment does not need to satisfy all of the above conditional expressions simultaneously, and can achieve corresponding functions and effects by satisfying each conditional expression individually. It is naturally desirable, from the viewpoint of optical performance or downsizing of the zoom lens, that plural conditional expressions are satisfied.

For example, the second lens group of the zoom lens may employ a combination of a negative lens n1 with a refractive index $n_{n1}$ of 1.83400 and Abbe number $v_{n1}$ of 37.34 and a negative lens n2 with a refractive index $n_{n2}$ of 1.51680 and Abbe number $v_{n2}$ of 64.20, which can exhibit the same effect to zoom lenses in the present embodiment. Alternatively, the second lens group of the zoom lens may employ a combination of a negative lens n1 with a refractive index $n_{n1}$ of 1.88300 and Abbe number $v_{n1}$ of 40.80 and a negative lens n2 with a refractive index $n_{n2}$ of 1.58913 and Abbe number $v_{n2}$ of 61.25, which can exhibit the same effect to zoom lenses in the present embodiment.

The invention claimed is:

1. A zoom lens comprising, in order from an object side thereof:
   a first lens group with a positive refractive power;
   a second lens group with a negative refractive power;
   a third lens group with a positive refractive power;
   a fourth lens group with a negative refractive power; and
   a fifth lens group with a positive refractive power,
   wherein a power of the zoom lens is varied by changing intervals between neighboring lens groups in the first through fifth lens groups,
   the second lens group comprises a cemented lens consisting of one positive lens and one negative lens, and
   the third lens group comprises a cemented lens consisting of two positive lenses and one negative lens.

2. The zoom lens of claim 1,
   wherein the second lens group consists of a negative lens n1, a negative lens n2, and a positive lens p1, in order from the object side, and
   the negative lens n2 and the positive lens p1 are cemented and satisfy the following expressions:

$n_{n1} > 1.7$, $n_{p1} - n_{n2} > 0.2$, where $n_{n1}$ is a refractive index of the negative lens n1 for d-line,
   $n_{n2}$ is a refractive index of the negative lens n2 for d-line, and
   $n_{p1}$ is a refractive index of the positive lens p1 for d-line.

3. The zoom lens of claim 1,
   wherein the second lens group consists of a negative lens n1, a negative lens n2, and a positive lens p1, in order from the object side, and
   the negative lens n2 and the positive lens p1 are cemented and satisfy the following expressions:

$n_{n1} > 1.8$, $n_{p1} - n_{n2} > 0.4$, where $n_{n1}$ is a refractive index of the negative lens n1 for d-line,
   $n_{n2}$ is a refractive index of the negative lens n2 for d-line, and
   $n_{p1}$ is a refractive index of the positive lens p1 for d-line.

4. The zoom lens of claim 1,
   wherein the second lens group satisfies the following expression;

$0.2 < |f_2/(f_W \times f_T)^{1/2}| < 1.0$ where $f_2$ is a focal length of the second lens group,
   $f_W$ is a focal length of a total system of the zoom lens at a wide-angle end, and
   $f_T$ is a focal length of the total system of the zoom lens at a telephoto end.

5. The zoom lens of claim 1,
   wherein the second lens group satisfies the following expression:

$0.2 < |f_2/(f_W \times f_T)^{1/2}| < 0.6$ where $f_2$ is a focal length of the second lens group,
   $f_W$ is a focal length of a total system of the zoom lens at a wide-angle end, and
   $f_T$ is a focal length of the total system of the zoom lens at a telephoto end.

6. The zoom lens of claim 1,
   wherein the cemented lens in the third lens group consists of a positive lens c1, a negative lens c2, and a positive lens c3, in order from the object side, and satisfies the following expressions:

$0.1 < n_{c2} - n_{c1}$ $10 < v_{c1} - v_{c2} < 45$ where $n_{c1}$ is a refractive index of the positive lens c1 for d-line,
   $n_{c2}$ is a refractive index of the negative lens c2 for d-line,
   $v_{c1}$ is an Abbe number of the positive lens c1, and
   $v_{c2}$ is an Abbe number of the negative lens c2.

7. The zoom lens of claim 1,
   wherein the cemented lens in the third lens group consists of a positive lens c1, a negative lens c2, and a positive lens c3, in order from the object side, and satisfies the following expressions:

$0.25 < n_{c2} - n_{c1}$ $20 < v_{c1} - v_{c2} < 35$ where $n_{c1}$ is a refractive index of the positive lens c1 for d-line, $n_{c2}$ is a refractive index of the negative lens c2 for d-line, $v_{c1}$ is an Abbe number of the positive lens c1, and $v_{c2}$ is an Abbe number of the negative lens c2.

8. The zoom lens of claim 1, wherein the cemented lens in the third lens group consists of a positive lens c1, a negative lens c2, and a positive lens c3, in order from the object side, and satisfies the following expressions:

$$0.1 < n_{c2} - n_{c3}$$

$$10 < v_{c3} - v_{c2} < 40$$

where $n_{c2}$ is a refractive index of the negative lens c2 for d-line, $n_{c3}$ is a refractive index of the positive lens c3 for d-line, $v_{c2}$ is an Abbe number of the negative lens c2, and $v_{c3}$ is an Abbe number of the negative lens c3.

9. The zoom lens of claim 1, wherein the cemented lens in the third lens group consists of a positive lens c1, a negative lens c2, and a positive lens c3, in order from the object side, and satisfies the following expressions:

$$0.2 < n_{c2} - n_{c3}$$

$$20 < v_{c3} - v_{c2} < 30$$

where $n_{c2}$ is a refractive index of the negative lens c2 for d-line, $n_{c3}$ is a refractive index of the positive lens c3 for d-line, $v_{c2}$ is an Abbe number of the negative lens c2, and $v_{c3}$ is an Abbe number of the positive lens c3.

10. The zoom lens of claim 1, wherein the cemented lens in the third lens group consists of a positive lens c1, a negative lens c2, and a positive lens c3, in order from the object side, and the positive lens c1 satisfies the following expression:

$$60 < v_{c1} < 75$$

where $v_{c1}$ is an Abbe number of the positive lens c1.

11. The zoom lens of claim 1, wherein the cemented lens in the third lens group consists of a positive lens c1, a negative lens c2, and a positive lens c3, in order from the object side, and the negative lens c2 satisfies the following expression;

$$30 < v_{c2} < 45$$

where vhd c2 is an Abbe number of the negative lens c2.

12. The zoom lens of claim 1, wherein the cemented lens in the third lens group consists of a positive lens c1, a negative lens c2, and a positive lens c3, in order from the object side, and the positive lens c3 satisfies the following expression:

$$50 < v_{c3} < 70$$

where $v_{c3}$ is an Abbe number of the positive lens c3.

13. The zoom lens of claim 1, wherein the third lens group satisfies the following expression:

$$0.3 < |f_3/(f_W \times f_T)^{1/2}| < 1$$

where $f_3$ is a focal length of the third lens group, $f_W$ is a focal length of a total system of the zoom lens at a wide-angle end, and $f_T$ is a focal length of the total system of the zoom lens at a telephoto end.

14. The zoom lens of claim 1, wherein the third lens group satisfies the following expression:

$$0.4 < f_3/(f_W \times f_T)^{1/2} < 0.8$$

where $f_3$ is a focal length of the third lens group, $f_W$ is a focal length of a total system of the zoom lens at a wide-angle end, and $f_T$ is a focal length of the total system of the zoom lens at a telephoto end.

15. The zoom lens of claim 1, wherein the fourth lens group consists of one plastic aspheric lens and satisfies the following expression:

$$|(f_W \times f_T)^{1/2}/f_4| < 2$$

where $f_4$ is a focal length of the fourth lens group, $f_W$ is a focal length of a total system of the zoom lens at a wide-angle end, and $f_T$ is a focal length of the total system of the zoom lens at a telephoto end.

16. The zoom lens of claim 1, wherein the fourth lens group consists of one plastic aspheric lens and satisfies the following expression:

$$|(f_W \times f_T)^{1/2}/f_4| < 1.5$$

where $f_4$ is a focal length of the fourth lens group, $f_W$ is a focal length of a total system of the zoom lens at a wide-angle end, and $f_T$ is a focal length of the total system of the zoom lens at a telephoto end.

17. The zoom lens of claim 1, wherein the fifth lens group consists of one plastic aspheric lens and satisfies the following expression:

$$(f_W \times f_T)^{1/2}/f_5 < 2$$

where $f_5$ is a focal length of the fifth lens group, $f_W$ is a focal length of a total system of the zoom lens at a wide-angle end, and $f_T$ is a focal length of the total system of the zoom lens at a telephoto end.

18. The zoom lens of claim 1, wherein the fifth lens group consists of one plastic aspheric lens and satisfies the following expression:

$$(f_W \times f_T)^{1/2}/f_5 < 1.3$$

where $f_5$ is a focal length of the fifth lens group, $f_W$ is a focal length of a total system of the zoom lens at a wide-angle end, and $f_T$ is a focal length of the total system of the zoom lens at a telephoto end.

19. The zoom lens of claim 1, wherein the zoom lens adjusts a focus from an object at an infinity to an object at a finite distance by moving the forth lens group.

20. The zoom lens of claim 1, wherein the fifth lens group is statically positioned for varying the power of the zoom lens.

* * * * *